United States Patent
Lempiö et al.

(12) 
(10) Patent No.: US 6,430,411 B1
(45) Date of Patent: *Aug. 6, 2002

(54) METHOD AND DEVICE FOR SELECTING A DESTINATION TELEPHONE NUMBER USING A MOBILE STATION

(75) Inventors: Jarkko Lempiö; Virpi Säntti, both of Tampere (FI)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/421,981

(22) Filed: Oct. 20, 1999

(30) Foreign Application Priority Data

Oct. 23, 1998 (FI) .................................................. 982304

(51) Int. Cl.[7] .............................. H04Q 7/20; H04M 1/00
(52) U.S. Cl. ....................... 455/432; 455/460; 455/456; 455/556
(58) Field of Search ................................ 455/432–435, 455/456, 457, 422, 425, 460, 461, 517, 564, 575, 550, 556

(56) References Cited

U.S. PATENT DOCUMENTS

| | | | |
|---|---|---|---|
| 5,109,399 A | | 4/1992 | Thompson .................... 379/45 |
| 5,727,057 A | | 3/1998 | Emery et al. ................ 379/211 |
| 5,850,433 A | | 12/1998 | Rondeau ..................... 379/201 |
| 5,889,852 A | * | 3/1999 | Rosecrans et al. .......... 379/355 |
| 6,026,309 A | * | 2/2000 | Moon et al. ................. 455/566 |
| 6,029,069 A | * | 2/2000 | Takaki ........................ 455/456 |
| 6,185,208 B1 | * | 2/2001 | Liao ............................ 370/392 |

FOREIGN PATENT DOCUMENTS

| | | | |
|---|---|---|---|
| DE | 196 01 334 | | 7/1997 |
| DE | 19601334 | | 7/1997 |
| WO | WO 95/24707 | * | 9/1995 ........... G09B/29/10 |
| WO | WO 96/04526 | | 2/1996 |
| WO | WO 96/27972 | | 12/1996 |
| WO | WO 98/15075 | | 9/1998 |
| WO | WO 98/57506 | | 12/1998 |

OTHER PUBLICATIONS

Patent Abstracts Of Japan, publication No.: 09287964.
* WO 98/23108 is published version of FI 964621.
** WO 96/36193 is published version of FI 103245.
Patent Abstracts of Japan JP 10215476.

* cited by examiner

Primary Examiner—Edward F. Urban
Assistant Examiner—Meless Zewdun
(74) Attorney, Agent, or Firm—Perman & Green, LLP

(57) ABSTRACT

To facilitate calling from a mobile station, a method and a device have been invented by means of which the selection of the phone number of a subscriber B has been made easier. When using a mobile station as a navigation device or in connection with one, a connection for one or more records to phone numbers in an abbreviated dialling memory of the mobile station is defined in a geographical point of interest (POI) database of the navigation device. In this way, after the user has first selected his navigation POI, he can make a call to the POI by using a specific 'call POI' switch without having to search the abbreviated dialling memory for a phone number corresponding to the navigation POI at hand and without himself having to dial the phone number. The connection of the navigation POI database to elements of the intercom dialling memory, according to the invention, is preferably implemented by including, in the navigation POI database, a field for the records for an intercom dialling element index.

14 Claims, 5 Drawing Sheets

METHOD AND DEVICE FOR SELECTING A DESTINATION TELEPHONE NUMBER USING A MOBILE STATION

FIELD OF THE INVENTION

The present invention relates to mobile stations, especially, to making a call from a mobile station.

BACKGROUND OF THE INVENTION

In mobile phones, an abbreviated dialling memory has commonly been used, wherein a mobile phone user can enter phone numbers used by him and the names that correspond to them. Thus, the user does not need a traditional paper phone book when making a call to the most commonly used phone numbers even if he did not remember them by heart if he once has input the number and the corresponding name in his phone.

As mobile phones have developed, an increasing number of different kinds of functions have been started to be connected to them, the purpose of which is to offer their users useful functions. For example, various kinds of terminals have been designed for a car, which besides functioning as a traditional car phone also function as a navigation and guiding device. Such a terminal can guide its user to a point of interest (POI). A position can also be transmitted from one mobile station to another as described in patent application DE 19601334. It is true that when navigating to a POI, the user can be guided to and receive information on the POI but if he should make a call to the POI, e.g. to inform that he will be late for a meeting, he must first search his phone book for a number on the basis of the name of a person or a target company at the POI, and call it. Especially in a car environment, drawing a driver's attention away from traffic should be avoided for safety reason s. Therefore, there exists a need for a method, which would make it easier to make a call to a point of interest.

SUMMARY OF THE INVENTION

Now, a method and a device have been invented by means of which the name of and the position data on a point of interest, as well as the phone number or several phone numbers relating to the POI are connected to a single title and the item established in this manner is used for both navigation and making it easier to call the POI. The user can be offered a uniform means to call his POI, independent of the name and number of a subscriber B, whereupon the user does not necessarily have to take his eyes off traffic at all when wanting to call the POI.

A device according to the invention preferably has a normal phone book used in mobile phones, each record of which comprises a phone number and possibly a name corresponding to it, and a database comprising the positions of POIs, which has the coordinates of each POI and/or address, as well as the index(es) of one or more phone numbers located at the POI, input in a first phone book.

It is characteristic of a method according to the invention for retrieving a phone number with a mobile station that it comprises allowing a user to select a specific geographical target by means of a mobile station, retrieving from a memory data on the selected target, the data comprising at least its position and phone number, allowing the user to initiate a call to the selected target using said phone number known to the mobile station.

It is characteristic of a mobile station according to the invention, comprising a memory for storing phone numbers and means for connecting a name to a phone number to be stored in the memory, that it comprises means for storing data on at least one geographical target, means for connecting the data on said geographical target to the stored phone number, means for browsing data on at least one geographical target, and means for making a call to the phone number connected to the data on the geographical target presented each time.

BRIEF DESCRIPTION OF THE DRAWINGS

In the following, the present invention will be discussed in detail by referring to the enclosed drawings, in which.

DETAILED DESCRIPTION

Figure 1:
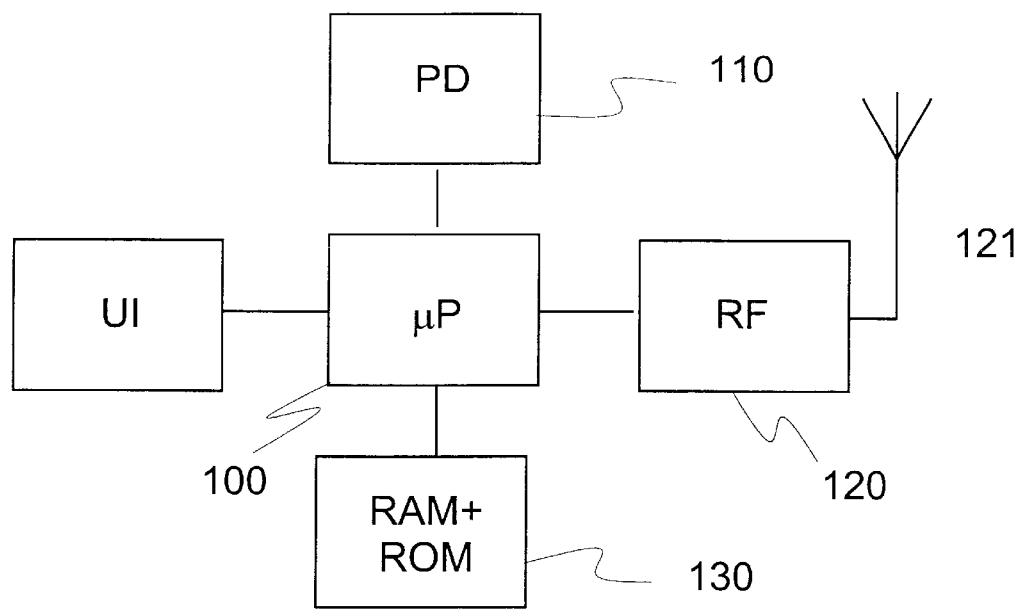
FIG. 1 is a block diagram of parts of a mobile station according to the invention.

FIG. 1 is a block diagram of the most important parts of a mobile station, according to the invention, suitable for use as a navigation device. The mobile station is otherwise a device constructed for use on a normal mobile communication network, e.g. GSM but, in addition, it has a positioning device PD 110 or it has been or can be connected thereto. By means of the positioning device, the mobile station can also be used for navigation, whereupon it makes it easier to locate the POI. The mobile station also has a processor 100, a radio part 120, an antenna 121, a RAM and ROM 130, as well as a user interface UI. Instead of a positioning device that is in connection with the mobile station, it is also possible to use, e.g. the position determined by the mobile communication network for positioning the mobile station.

Figure 2:
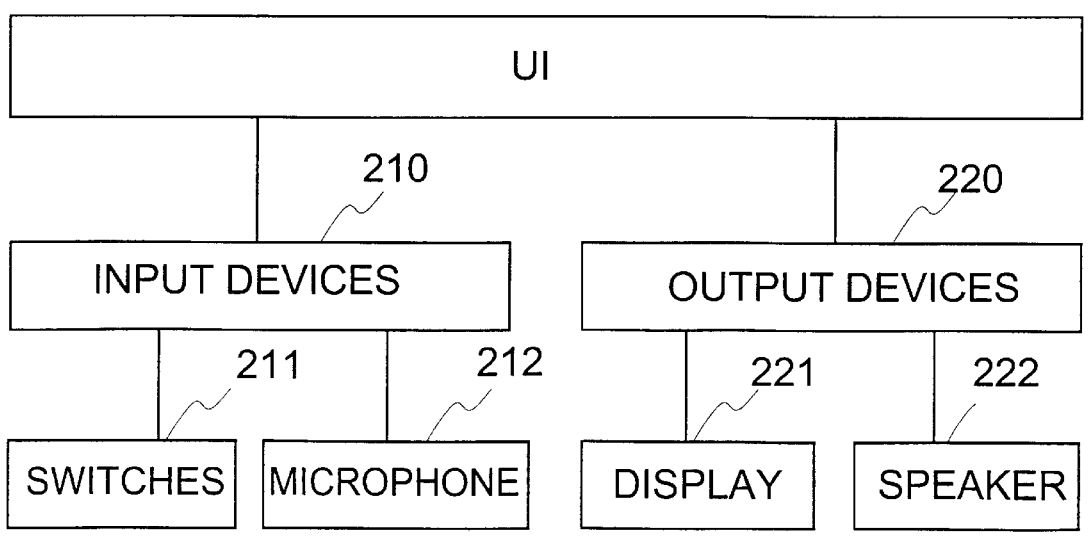
FIG. 2 is a block diagram of parts of a user interface of a mobile station according to the invention.

FIG. 2 is a block diagram of parts of a user interface UI of a mobile station according to the invention. These include input devices 210 and output devices 220. By means of the input devices, a user can control his mobile station. The input devices include different kinds of switches 211, such as a numeric keypad, as well as a microphone 212 and possibly speech recognition devices connected thereto by means of which the mobile station can be controlled by speech. The output devices, by means of which the mobile station can present data to its user, include a display 221 and a speaker 222. The speaker can be used, e.g. to tell about new instructions and other such data with a sound signal or, if the mobile station also comprises a speech synthesiser, it can present to the user with its speaker instructions in the form of speech and responses to the user's controls.

Figure 3:
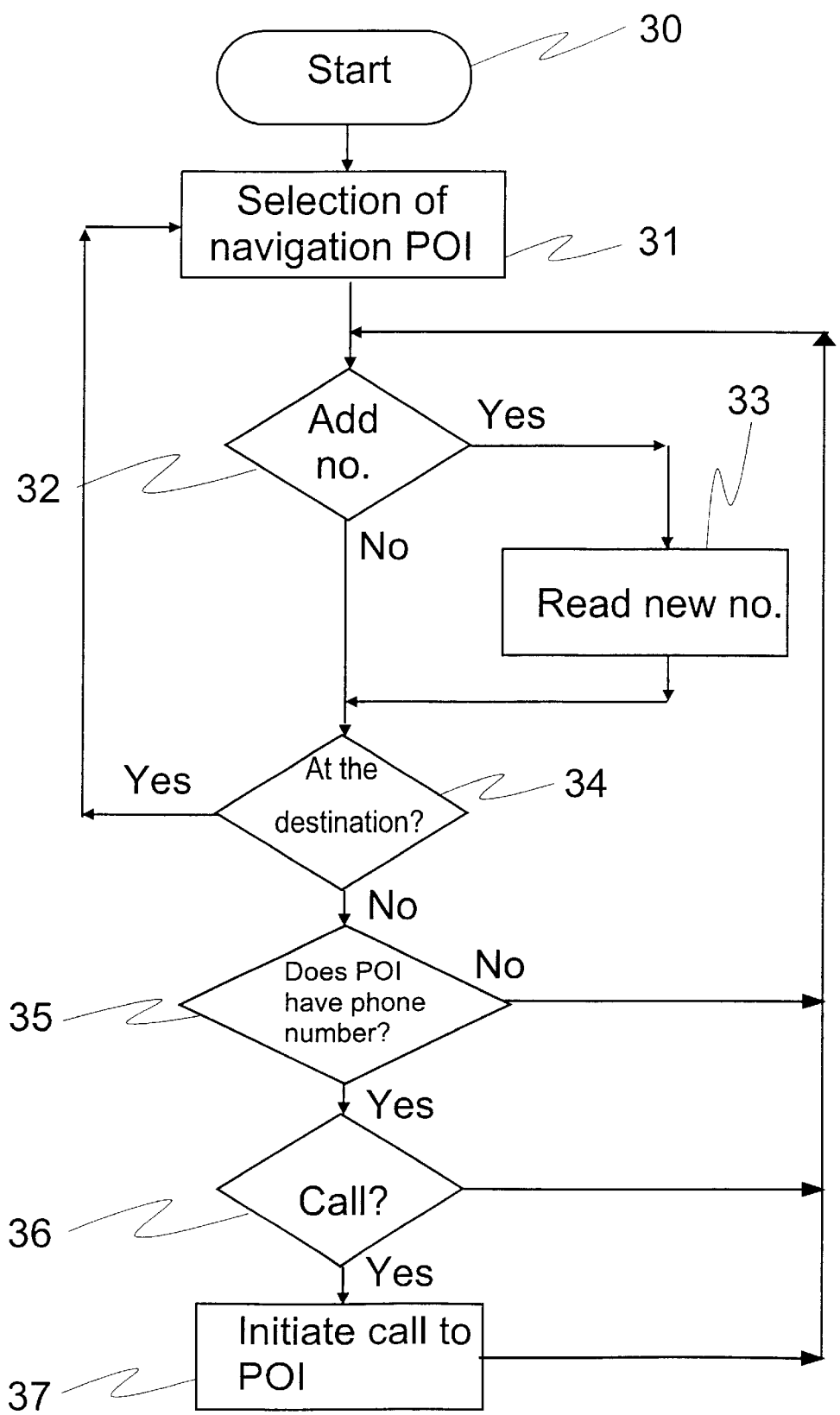
FIG. 3 is a flow diagram of the operation of a mobile station according to the invention as for making a call on the basis of the position of a POI.

FIG. 3 is a flow diagram of the operation of a mobile station, according to the invention, for making a call on the bases of the position of a POI. The performance begins from a block 30, i.e. the start. A user selects, in a block 31, a navigation object, i.e. the POI where he is going. It will be checked, in a block 32, whether the user wants to add a new phone number for the POI. If this is the case, it will be read, e.g. from the keypad in a block 33, and it will then be continued from a block 34, otherwise, it will be proceeded directly to the block 34. In the block 34, the mobile station checks, e.g. by means of a positioning device, whether the POI has been reached. If this is the case, it will ask again for a new POI in the block 31, otherwise it will check, in a block 35, whether it knows any phone number for the POI. If not, it preferably turns grey the legend of a button 'Call POI', presented to the user on the display, which will be explained later, and returns to the block 32 to check whether the user would like to input the phone number of the POI. In the contrary case, the mobile station indicates its user that it is allowed to make a call to the POI by presenting, in a normal way, the above-mentioned legend 'Call POI' and checks, in a block 36, whether the user has used a switch reserved for making a call to a POI in order to make the call. If he has not, it will be returned to the block 32, otherwise, the mobile station will try to initiate, in a block 37, a call to the phone number found for the POI or, if there are several numbers, it preferably lets the user select the most suitable of them before it tries to initiate a call to the POI.

Because the user may, during the journey, add to the memory of his mobile station a number that the POI lacked, it will preferably be returned to the block 32 later to check the existence of the number even if it had not existed before. In can also be checked, in the block 32, whether a phone number for the POI, based on a position, is available through a mobile communication network, preferably one with the name corresponding to it already in the phone book although without any position data.

Figure 3B:
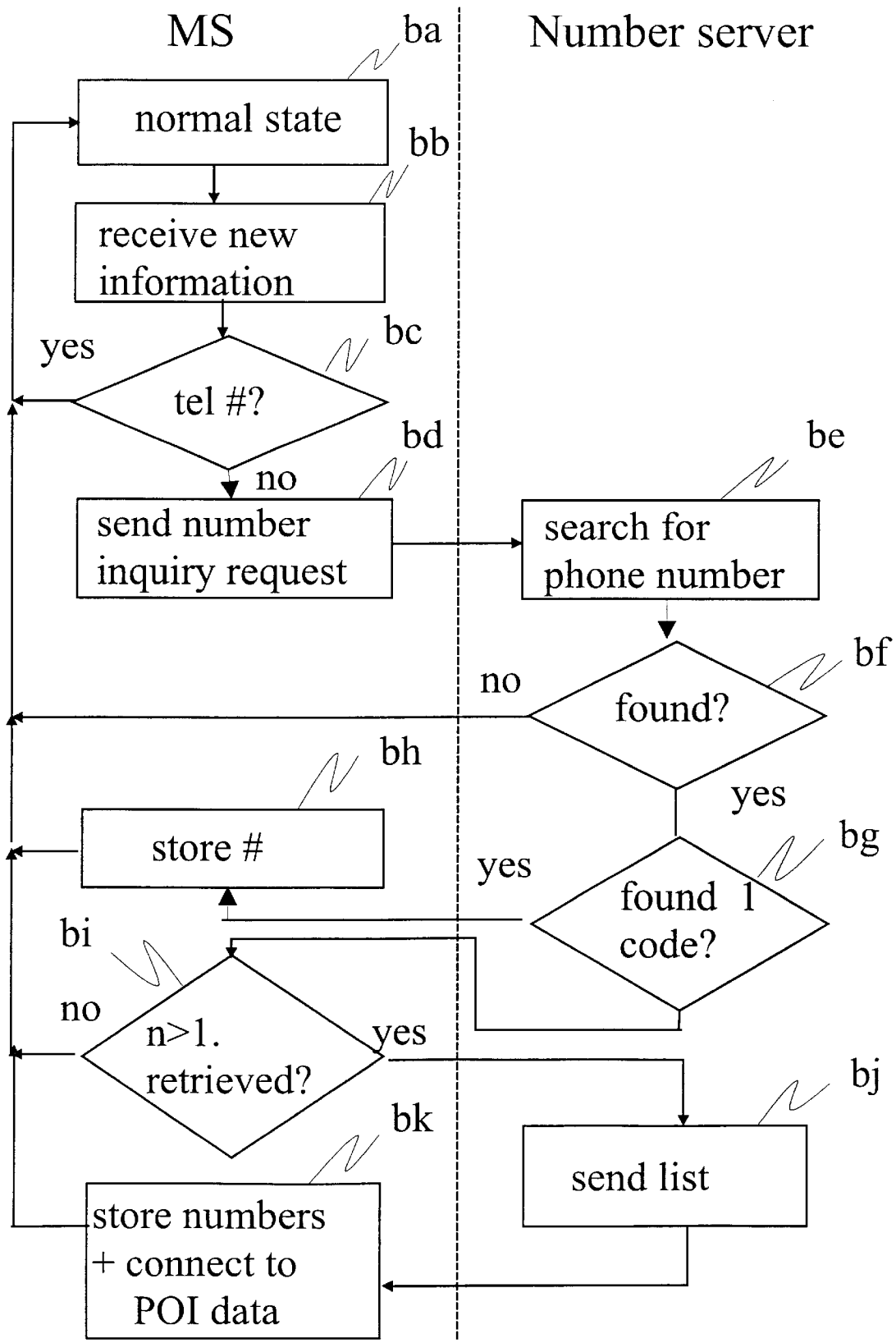
FIG. 3b is a flow diagram of the operation of a mobile station, according to the invention, for finding out the phone number of a POI using an external directory inquiry server.

FIG. 3b shows a method where a mobile station connects to a POI its phone number by using an external directory inquiry server. Thus, while the user is navigating, e.g. towards the Empire State Building, he can get the phone number of his acquaintance working there from among a large number of other phone numbers in the same building. The figure begins from a block ba, normal function. When the mobile station receives, in a block bb, information or data on a new POI, the mobile station checks, in a block bc, whether the data on the POI also include its phone number. If not, the mobile station will automatically send once in a block bd, for example, by using a short message service, a directory inquiry request concerning the POI. In a block be, the directory inquiry server looks for numbers the address of which, with a certain accuracy, is the same as that of the POI, e.g. the address is the same town, sector, street or co-ordinates. In addition to the data provided by the POI itself, it can use, as a further specifier, a cross-reference to the numbers that are in the mobile station's phone book. The acquaintance, in the example, may well have a home number somewhere else, but the directory inquiry will find, on the basis of the phone number, first a full name and then, on the basis of the name and the address used as the POI, a second, desired phone number. If the POI is presented in the mobile station as co-ordinates without a street address, the directory inquiry or the external server must first find out the street address on the basis of the coordinates, e.g. by using a digital vector map drawn of the area. In a block bf, it will be checked whether a phone number was found for the POI. If not, the procedure will return to the block ba, otherwise it will move to a block bg. The block bg checks whether exactly one phone number was found for the POI and, if this is the case, the number will be sent to the mobile station for being stored in a block bh, after which the mobile station returns to its normal state to the block ba. Otherwise, the server will preferably send the mobile station, in a block bi, a question "Will several numbers be retrieved" and preferably also the number of the phone numbers to be retrieved. Alternatively, the number of the phone numbers to be retrieved may also be requested from the user and read here. If the user does not want more than one number to be transmitted to him, the procedure will proceed to the mobile station's block normal state ba, otherwise it will send the server a request to transmit the numbers found or, of these, the numbers indicated by the number selected by the user, and the server, in a block bj, transmits the requested numbers to the mobile station which, in a block bk, stores them and connects them to the data on the POI. Then, the procedure will again return to the block normal state ba.

Figure 4:
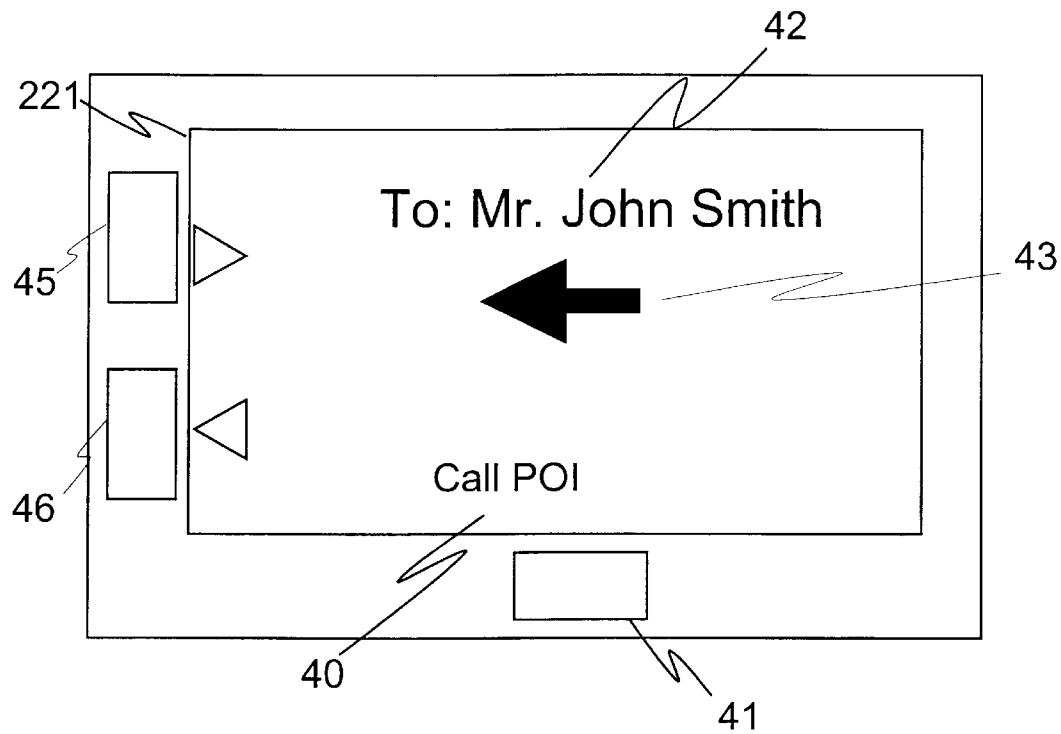
FIG. 4 shows a view from a display unit of a mobile station according to the invention.

FIG. 4 shows a view from the display unit 221 of a mobile station according to the invention. The display shows a POI name 42 and roughly an indicator arrow 43 indicating the direction of the position, as well as a function key 41 and its legend 40 'Call POI'. The display also has function keys 45 and 46 and, on the side of the display, patterns that correspond to them for selecting the next and the previous POI. If the display 221 is a touch screen, it itself functions then as the key 'Call POI' when pressed at the point of the legend. The user is always offered for calling a POI, in a uniform manner, a key the pressing of which initiates a call to a POI. Alternatively, speech recognition can be used for this, whereupon with some standard phrase, e.g. 'Call POI', the user may call the POI if his mobile station knows at least one phone number belonging to it.

If there are more than one phone numbers for the POI, the user may preferably be offered by the pressing of the key 'Call POI' a list of the available alternatives. Preferably still, one of these alternatives can be set as default and then the default alternative is preferably indicated by the cursor when the list is presented to the user. From the list, the user can select a suitable number, e.g. by using the arrow keys. Preferably, the alternative selected from the list is accepted in the same way as the selection 'Call POI' was originally implemented, e.g. by re-pressing the key intended for this. Alternatively, if the user does not attempt to change the place of the cursor, after a specific delay, the mobile station will automatically initiate a call to the default POI.

By using the function key 45, the user can select data on the next POI known to the mobile station for being presented and, with the function key 46, data on the previous POI for being presented.

Figure 5:
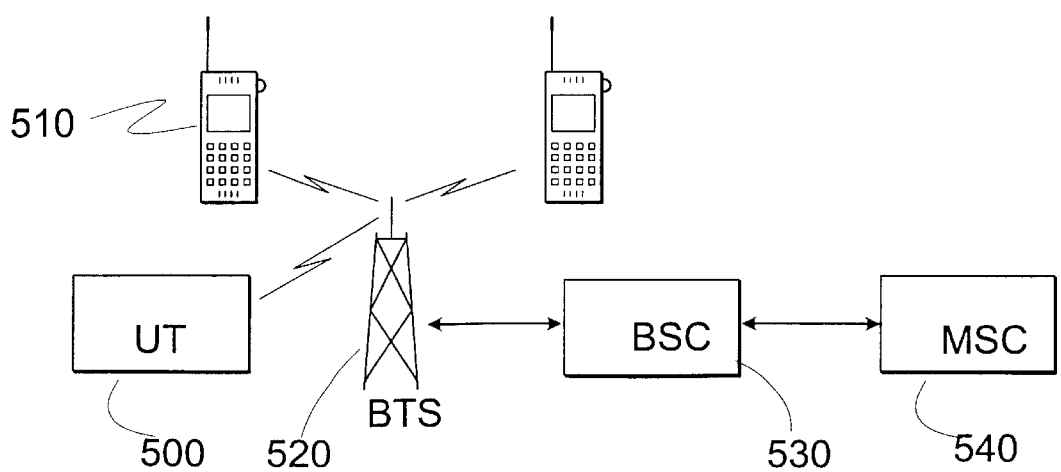
FIG. 5 is a block diagram of a mobile communication network according to the invention.

FIG. 5 is a block diagram of a mobile communication network according to the invention. A mobile services switching centre 540 controls a base station controller or controllers 530 and each base station controller controls at least one base station 520. Each mobile phone 510 and mobile station 500, according to the invention, connects to the mobile communication network through one base station. Because the coverage area of the base stations' radio transmission is limited, the base station used indicates the device connected to the mobile communication network at least at the accuracy of its coverage area. In densely populated areas, it is economical to use a lower base station transmission power, whereupon the coverage area is even smaller and radio frequencies can be used more effectively. In this case, the positioning of a mobile station connected to the network through a base station is more accurate. For example, with the present GSM networks it is possible to achieve an accuracy in the range of one kilometre. A mobile communication network can be developed to also send the position of a mobile station determined by it to the mobile station itself, whereupon it does not need a positioning device for determining its position. Preferably, such a feature will also be built in a mobile communication network that when a call is made to a mobile station connected thereto, in addition to the phone number of a subscriber A, the position and name of the subscriber A will also be transmitted to it. In this way, the mobile station will be provided with these data on its POI immediately when his mobile station is called for the first time from the POI. If the subscriber A has a GSM phone, his position at any given time during the call is in the GSM network's VLR (visitor Location Register) database and this information can be used as the position and name of the subscriber A when he makes a call to a mobile station according to the invention.

Alternatively, the terminal can be, e.g. an ordinary GSM mobile phone which, when connected to a specific server, can function as a navigator and, in this case, the server can have the necessary logic and memory for making a call to the POI. The terminal can be a hand-held device or it can be a fixed device intended to be installed in a vehicle (e.g. car, lorry or boat).

The mobile communication network is preferably connected to a public telecommunication network whereupon, in addition to mobile phones, calls can be made with a mobile station according to the invention, connected to the network, to different types of wired telephones, fax machines, answering services, etc.

Figure 6:
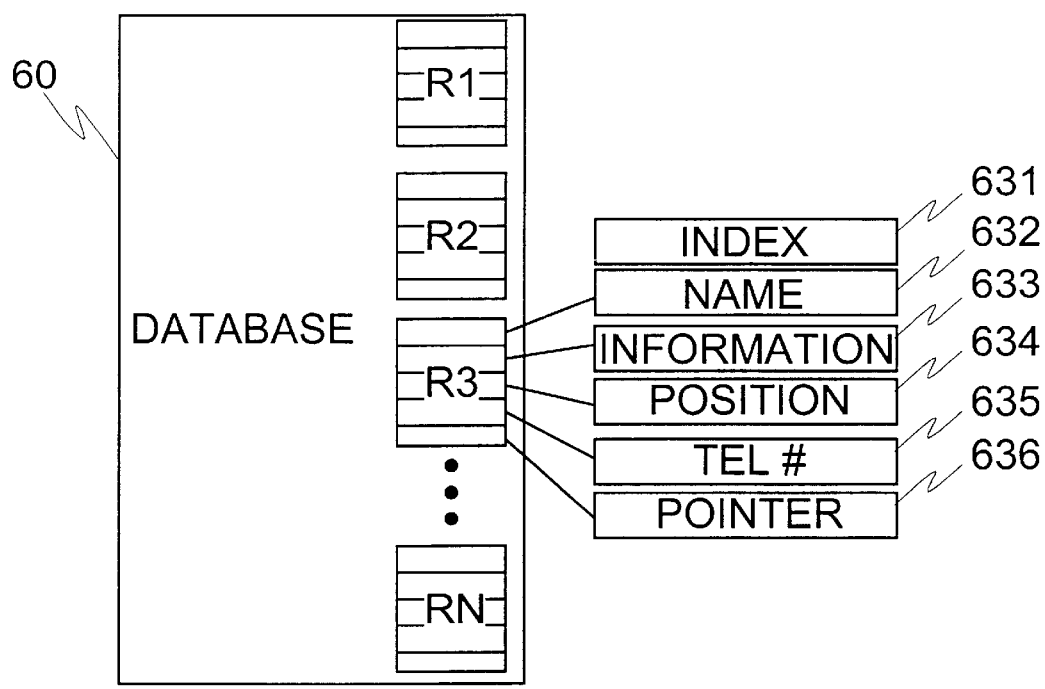
FIG. 6 shows a structure of a POI database used for navigation.

FIG. 6 shows the structure of a POI database 60 used for navigation. The database 60 has a set of records R1, R2, R3 . . . Rn each comprising fields: index 631, POI name 632, POI data 633, and POI position 634. The function of the index is only to speed up the operation of the database, but it can also be omitted. The records also preferably comprise a field 635 for the phone number of a POI and/or a field 636 for being used as a pointer when combining the database 60 and the phone book of the mobile station as presented below. The database 60 can be, e.g. in a memory 130 of the mobile station.

Figure 7:
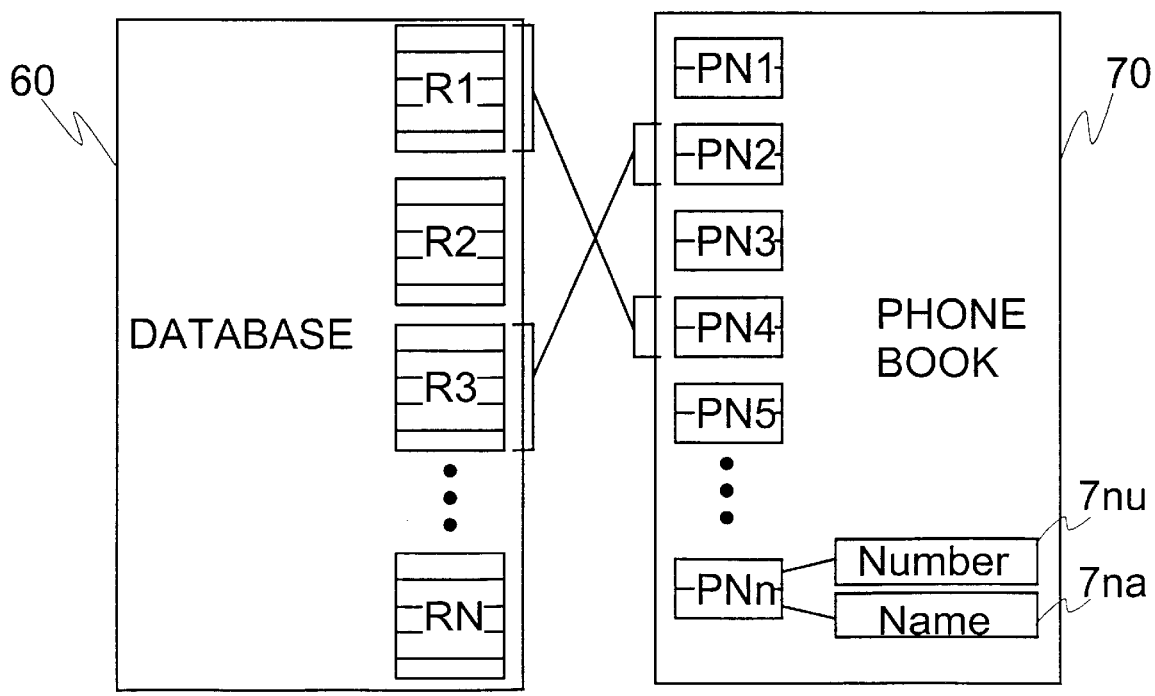
FIG. 7 shows a structure of a database that functions as a phone book of a mobile station according to the invention.

FIG. 7 shows a database structure that functions as a phone book 70 of a mobile station according to the invention. The phone book is preferably stored in the phone's own memory 130 (see FIG. 1), but it can alternatively be located, e.g. in a memory of a positioning device 110 or in some external server whereto the mobile station connects, e.g. through a mobile communication network. The phone book 70 comprises a set of phone numbers PN1, PN2, PN3, PN4, PN5 . . . PNn and, for each number, at least a field 7nu for a phone number and preferably also a field 7na for a name that corresponds to the phone number. The figure also shows that, with a mobile station according to the invention, it is possible to link the records of the phone book 70 and the database 60, used for navigation, that correspond to one another. The definition of the records of the phone book and the POI database that correspond to one another can be implemented, e.g. by the user by means of the input devices shown in FIG. 2. Alternatively, the mobile station can try to determine, on the basis of the name of each record of the database 60 and the phone book 70, fields that belong together, e.g. by suggesting to the user that such fields be connected of the names of which a specific number of first letters are similar. To each other, the phone number known corresponding to each POI is preferably connected to the database 60 so that the number or index of the memory location of the phone book record that corresponds to the record is stored in a field 636, if the phone book records comprise such. The purpose of linking the database 60 and the phone book is to arrange for the use of the mobile station a phone number that corresponds to the position of at least one POI so that the user can select it when the POI is at hand.

The advantage of the invention is that with a mobile communication device used for navigation purposes, it is possible to establish a call to a POI considerably easier than today. This is particularly advantageous when used in a car, when the user does not have to take his eyes off traffic unnecessarily. The user can call his current POI with a single button, if the number of the POI has been input in the mobile station. This is particularly beneficial when a person who should be attending a meeting notices that he will be late and wants to inform others of the delay or, for example, if he finds that he needs additional data in order to find his way to the POI or to ask for advice to find a parking place. The fact is that usually persons at a place of destination know more about the place that a person who is possibly going there for the first time.

A mobile station according to the invention is also preferably arranged to remember the POIs, which have been visited last. Thus, the user of the mobile station can easily call, e.g. the last ten places he has visited by using the buffer memory of the last places.

This paper presents the implementation and embodiments of the present invention with the help of examples. It is obvious to a person skilled in the art that the present invention is not restricted to details of the embodiments presented above, and that the invention can also be implemented in another form without deviating from the characteristics of the invention. The embodiments presented should be considered illustrative, but not restricting. For example, adding new POIs to the memory of a mobile station according to the invention can be implemented by the user using the input means of the mobile station, by means of a message received from a mobile communication network or another mobile station, e.g. as a message received through an infrared connection. Thus, the possibilities of implementing and using the invention are only restricted by the enclosed claims. Consequently, the various options of implementing the invention as determined by the claims, including the equivalent implementations, also belong to the scope of the invention.

What is claimed is:

1. A method for retrieving a phone number with a mobile station of a mobile communication network, comprising the steps of:

providing a user with a group of identifiers each corresponding to a geographical point of interest (POI), allowing a user to select a (POI) and its corresponding identifier with the mobile station, corresponding to the selected identifier, retrieving from a memory data on the selected POI, the data comprising at least the POI's position and phone number, and allowing the user to initiate a call to the selected POI using said phone number stored in the memory of the mobile station; wherein if the data in the memory does not include the phone number for the POI, the method further comprising the steps of, automatically contacting a server over the mobile communication network to obtain said phone number from the server, sending from the server to the mobile station the phone number over the mobile communication network, receiving the phone number at the mobile station, and storing the received phone number in the memory.

2. A method according to claim 1, wherein the selected POI is the place of destination at the time in question.

3. A method according to claim 1, wherein the selected POI is some other geographical target different from the place of destination or an intermediate stopping point of travel at the time in question.

4. A method according to claim 1, comprising allowing the user to add and change said data.

5. A method according to claim 1, comprising receiving data transmitted wirelessly to said mobile station on a geographical target, and storing received data in the mobile station's memory.

6. A method according to claim 1, comprising checking (35) whether there are several phone numbers of the selected POI available, and providing the user with an opportunity to select one of them.

7. A method according to claim 6, wherein after the user has selected one of several phone numbers of the selected POI, a call will be made to it after a specific period of time from the moment the user selected said phone number.

8. A method according to claim 6, wherein after the user has selected one of many phone numbers of a geographical target, a call will be made to it when the user confirms his choice.

9. The use of a method, according to claim 1, in a mobile station.

10. A method according to claim 1, further comprising a step of transferring said POI's position between the mobile station and a navigation device, and using said POI's position by the navigation device for locating the POI.

11. A mobile station comprising a memory for storing phone numbers and means for connecting a name to a phone number to be stored in the memory, comprising
means for storing the data on at least one geographical target,
means for connecting the data on said geographical target to a stored phone number, the mobile station further comprising means for:
automatically contacting a server over a mobile communications network to obtain a phone number associated with the geographical target when the data on the geographical target does not include the phone number;
means for receiving said phone number at the mobile station over the mobile communication network, and storing the received phone number in the memory as the stored phone number;
means for browsing the data on at least one geographical target, and
means for calling the number connected to the data on the geographical target presented at any given time.

12. A mobile station according to claim 11, wherein
said data on a geographical target comprise the name of said target,
said mobile station comprises means for comparing the name of said target to the names connected to the phone numbers stored in the mobile station's memory, and
the mobile station comprises means for connecting the data on a geographical target to the phone number stored in said memory, said names corresponding to one another with a specific accuracy.

13. A mobile station according to claim 11 further comprising means for transferring the position of a point of interest (POI) between the mobile station and a navigation device, said position transferring means being operative further for enabling a locating of the POI.

14. A system for employing geographical data of a point of interest (POI) with a mobile phone, comprising:
a mobile station comprising a memory for storing the phone numbers and means for connecting a name to any phone number to be stored in the memory,
the mobile station further comprising means for storing the data on at least one geographical target,
means for connecting the data on said geographical target to a stored phone number,
means for automatically contacting a server over a mobile communication network to obtain a phone number associated with the geographical target when the data on the geographical target does not include the phone number;
means for sending from the server to the mobile station said phone number over the mobile communication network; and
means for receiving said phone number at the mobile station, and storing the received phone number in the memory as the stored phone number;
means for browsing the data on at least one geographical target,
means for calling the number connected to the data on the geographical target presented at any given time,
navigation means providing location data out a POI to the memory, and
a user interface enabling a user to operate the mobile station while driving a vehicle.

* * * * *